(12) United States Patent
Chandran et al.

(10) Patent No.: US 11,165,712 B2
(45) Date of Patent: Nov. 2, 2021

(54) METHODS AND APPARATUS TO PROVIDE A CUSTOM INSTALLABLE OPEN VIRTUALIZATION APPLICATION FILE FOR ON-PREMISE INSTALLATION VIA THE CLOUD

(71) Applicant: VMWARE, INC., Palo Alto, CA (US)

(72) Inventors: Rachil Chandran, Bangalore (IN); Karthik Seshadri, Bangalore (IN); Akash Srivastava, Bangalore (IN); Siddartha Laxman Karibhimanvar, Bangalore (IN); Sivaraj M, Bangalore (IN)

(73) Assignee: VMWARE, INC., Palo Alto, CA (US)

( * ) Notice: Subject to any disclaimer, the term of this patent is extended or adjusted under 35 U.S.C. 154(b) by 65 days.

(21) Appl. No.: 16/801,183

(22) Filed: Feb. 26, 2020

(65) Prior Publication Data

US 2021/0136002 A1 May 6, 2021

(30) Foreign Application Priority Data

Oct. 30, 2019 (IN) .............................. 201941043892

(51) Int. Cl.
| | |
|---|---|
| *H04L 12/923* | (2013.01) |
| *H04L 12/911* | (2013.01) |
| *H04L 12/913* | (2013.01) |
| *H04L 9/08* | (2006.01) |
| *H04L 12/927* | (2013.01) |

(52) U.S. Cl.
CPC .......... *H04L 47/762* (2013.01); *H04L 9/0819* (2013.01); *H04L 47/724* (2013.01); *H04L 47/781* (2013.01); *H04L 47/808* (2013.01); *H04L 47/822* (2013.01); *H04L 47/828* (2013.01)

(58) Field of Classification Search
CPC ... H04L 9/0819; H04L 47/724; H04L 47/762; H04L 47/781; H04L 47/808; H04L 47/822; H04L 47/828
See application file for complete search history.

(56) References Cited

U.S. PATENT DOCUMENTS

| | | | |
|---|---|---|---|
| 2016/0357885 A1* | 12/2016 | Cao | .......................... H04L 67/10 |
| 2019/0140905 A1* | 5/2019 | Vembuli | ................ G06F 9/5077 |

OTHER PUBLICATIONS

VMWare, Inc., "vSphere Virtual Machine Administration", modified on Jul. 22, 2019, 242 pages.

* cited by examiner

*Primary Examiner* — Brian P Cox
(74) *Attorney, Agent, or Firm* — Hanley, Flight & Zimmerman, LLC

(57) ABSTRACT

Methods, apparatus, systems and articles of manufacture to provide a custom installable open virtualization application file for on-premise installation via the cloud are disclosed. An example apparatus includes a resource processor to determine a resource capacity for an agent in a private cloud network; a file manipulator to modify an open virtualization appliance (OVA) file by modifying a descriptor file of the OVA file to configure the resource capacity for the agent in the private cloud network, the OVA file being deployed in a public cloud network; and a first interface to transmit an indication to a location of the modified OVA file to a user device, the location of the modified OVA file being the same location as the OVA file.

39 Claims, 4 Drawing Sheets

METHODS AND APPARATUS TO PROVIDE A CUSTOM INSTALLABLE OPEN VIRTUALIZATION APPLICATION FILE FOR ON-PREMISE INSTALLATION VIA THE CLOUD

RELATED APPLICATIONS

Benefit is claimed under 35 U.S.C. 119(a)-(d) to Foreign Application Serial No. 201941043892 filed in India entitled "METHODS AND APPARATUS TO PROVIDE A CUSTOM INSTALLABLE OPEN VIRTUALIZATION APPLICATION FILE FOR ON-PREMISE INSTALLATION VIA THE CLOUD", on Oct. 30, 2019, by VMware, Inc., which is herein incorporated in its entirety by reference for all purposes.

FIELD OF THE DISCLOSURE

This disclosure relates generally to cloud computing, and, more particularly, to methods and apparatus to provide a custom installable open virtualization application file for on-premise installation via the cloud.

BACKGROUND

A user of software may obtain the software in the form of a downloadable licensed software and/or a licensed software obtained in a shrink-wrapped format (e.g., packaged on the shelf of a commercial dealer). Alternatively, a user may obtain and/or otherwise utilize the software in the form of a Software-as-a-Service (SaaS) model. A SaaS model enables the deployment of software in a cloud (e.g., a public cloud in the form of web services such as Amazon Web Services (AWS), a private cloud such as a cloud hosted by VMware vSphere™, Microsoft Hyper-V™, etc.) to a user.

Figure 1:
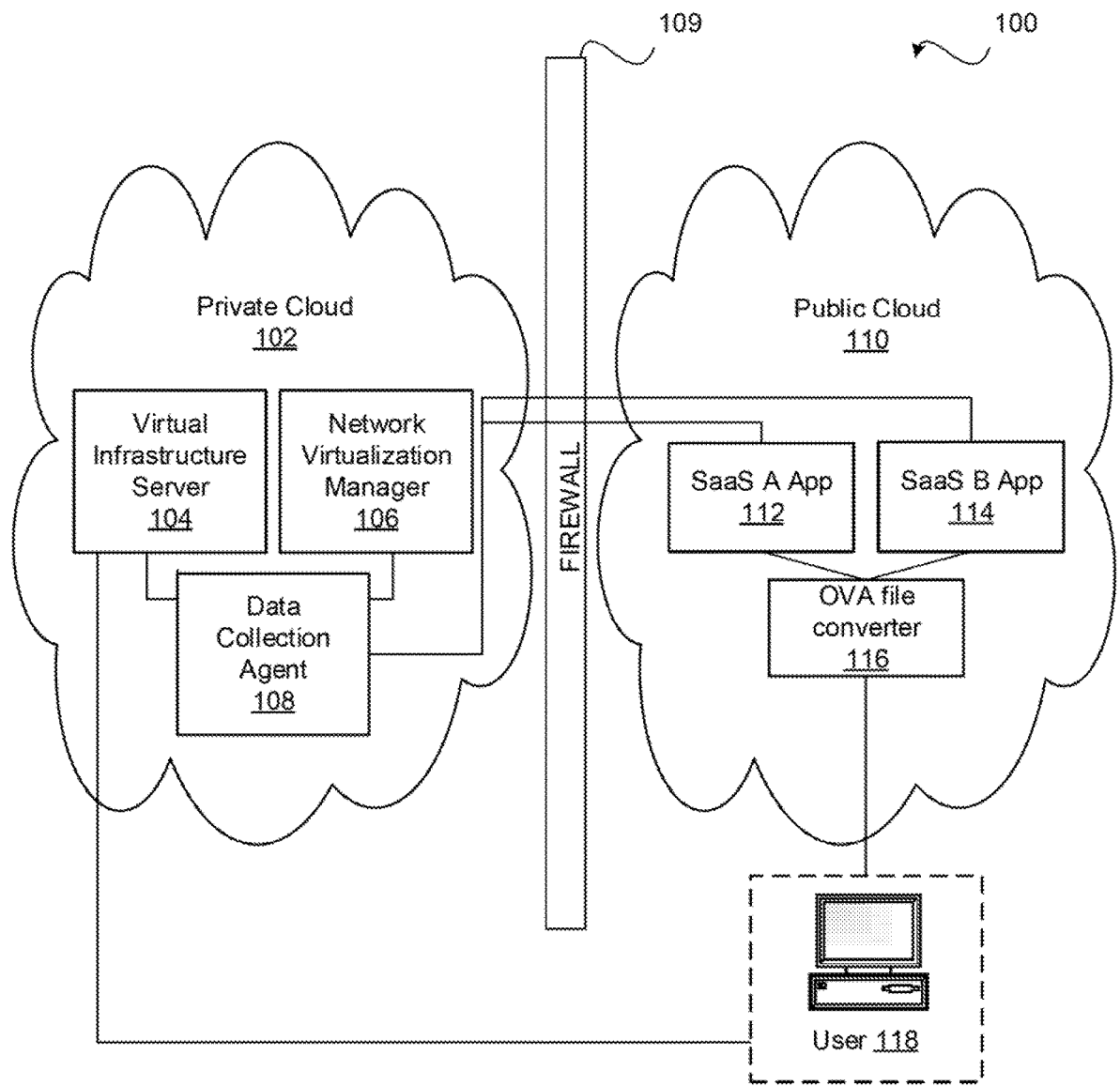
FIG. 1 is an illustration of an example environment including an example private cloud and an example public cloud.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Software (e.g., computer software) is a collection of data and/or instructions that tell a computer how to work. Traditionally, software is obtained by a user (e.g., a user operating a personal computer (PC), an enterprise operating on a computing infrastructure, etc.) in the form of a downloadable licensed software, and/or a licensed software obtained in a shrink-wrapped format (e.g., packaged on the shelf of a commercial dealer). For example, software such as binary files and/or executable files designed for a particular platform of hardware, a particular operating system, etc., are typically made available to customers via a downloadable license and/or a physical storage mechanism (e.g., portable storage mechanism, a Compact Disk (CD), a Universal Serial Bus (USB) flash drive, etc.) sold on the shelf of a commercial retailer. In such typical applications, software is delivered to the user for deployment and/or installation in the user's infrastructure (e.g., a home network PC, a commercial enterprise infrastructure, a datacenter apart of a Wide Area Network (WAN) belonging to the user's organization, etc.).

Alternatively, software may be provided utilizing a Software-as-a-Service (SaaS) model. A SaaS model enables deployment of a SaaS application in a cloud (e.g., a public cloud in the form of web services such as Amazon Web Services (AWS), a private cloud such as a cloud hosted by VMware vSphere™, Microsoft Hyper-V™, etc.)). Once the SaaS application has been deployed (e.g., installed on one or more servers and/or other computing devices in the public cloud), an end user can access the SaaS application to utilize the software deployed as part of the SaaS model using resources of the private cloud. In this manner, software corresponding to the SaaS is generated and/or deployed (e.g., as a SaaS application) to a common infrastructure accessible by varying tenants of the software. As used herein, a tenant refers to any suitable user (e.g., a personal user, an enterprise system, etc.) accessing and utilizing a SaaS application in a cloud. Furthermore, a SaaS application may be operable on a similar infrastructure as in the downloadable licensed software and/or a shrink-wrapped licensed software applications.

In operation, a SaaS application and/or a system enables a user to access the software corresponding to the SaaS from a cloud (e.g., a public cloud web service such as AMAZON WEB SERVICES™ (AWS™), a private cloud such as a cloud hosted by VMWARE VSPHERE™, MICROSOFT HYPER-V™, etc.)). In this manner, the provider of the SaaS typically handles installation, deployment, and/or maintenance of the corresponding infrastructure components (e.g., servers, datacenters, and/or computing devices hosting the SaaS application). A user may access the SaaS application (e.g., access software to be utilized) via a suitable user interface (UI) and/or Application Program Interface (API)

identifiable by Uniform Resource Locators (URLs). As such, a user may then access and use the SaaS application over any suitable WAN such as, for example, the World Wide Web over network connectivity.

Operating a SaaS application is advantageous for both a user and a provider of the SaaS application. For example, the provider of the SaaS can deliver quick and efficient software updates (e.g., bug fixes, additional features, etc.) to the common infrastructure hosting the SaaS application. In this manner, a provider of a SaaS application can deploy a software update for the SaaS application to all users accessing the common infrastructure, rather than distributing individual updates to each user in a downloadable licensed form and/or in a licensed shrink-wrap form.

While a SaaS application typically runs in the public cloud, private clouds (e.g., vSphere suite, vCenter, etc.) are hosted via computing resources that are on-premise (e.g., located in datacenters and/or hardware fenced from the outside world using firewalls). To gather data related to the private cloud, an agent may run on the infrastructure of the private cloud to be able to interact with and/or collect data from the underlying cloud's relevant components. In some examples, the agent may be deployed as a virtual machine in the private cloud to gather data from components of the private cloud. A user of the private cloud may deploy the agent by packing the agent as packaged file (e.g., an open virtualization application (OVA)) in a particular format (e.g., an open virtualization format (OVF)) corresponding to a virtualization stack. The private cloud utilizes the format to configure and/or apply software into a virtual applicate that can be installed or deployed in the virtualized environment. Once deployed and configured, the agent establishes a connection to the corresponding cloud service(s) and performs collection and/or actuations(s) for components of the private cloud.

When a user utilizes both a private cloud and a SaaS application in a public cloud, the user may desire an OVA-based data collection agent deployed on the private cloud to collect data from components of the SaaS application on the public cloud for processing (e.g., analysis, diagnostics, etc.) at the private cloud. To deploy an agent in the private cloud that communicates with a SaaS application in a public cloud, a build tool (e.g., buildweb) in the public cloud generates a packaged file (e.g., an OVA file) and a security key (e.g., to establish the connection between the private cloud and the public cloud via the firewall). For example, when a user wishes to deploy an OVA-based agent (e.g., a data collection agent) in his/her private cloud network that communicates with a SaaS application subscribed to by the user (e.g., for data collection, actuation, etc.), the user interfaces with prompt from the SaaS application to obtain a security key (e.g., one time key (OTK)) and a link to a prepacked OVA. The security key is a secret key that can be used by the private cloud as a handshake (e.g., to allow the private cloud to communicate with the SaaS application in the public cloud via the firewall). Once the OVA link and the OTK are obtained, the user provides the OVA link and OTK to a virtual infrastructure server of the private cloud (e.g., by typing the link and/or key, copying and pasting the link and/or key, etc. to a prompt from the virtual infrastructure server). In response to receiving the OVA link and OTK, the virtual infrastructure server deploys the OVA-based agent in the private cloud and opens a connection to the SaaS application through the firewall using the OTK.

Traditionally, the OVA file generated by the build tool in the public cloud corresponds to a preset configuration for amount of resource capacity (e.g., central processing unit (CPU) capacity and/or memory capacity) for an agent to be deployed. For example, because the build tool is implemented in the public cloud, the build tool may not know the structure, requirements, load, etc. of the components in the private cloud. In such an example, the build tool may generate an OVA file corresponding to an OVA-based agent that has a statistically predefined configuration for an agent in an average or worst case private cloud configuration. For example, the OVA file may correspond to an agent that has sufficient CPU, memory, storage, etc., to manage and/or collect usage statistics, events, and/or inventory of a virtual infrastructure server ecosystem including 10 virtual infrastructure servers in a private cloud with up to 10,000 virtual machines. However, when a user has a private cloud infrastructure with one virtual infrastructure server and only one hundred virtual machines, the standard configuration of the OVA file results in an agent that has more allocated CPU, memory, storage, etc., than is necessary, thereby preventing the allocated resources from being used for other purposes. Additionally, when a user (e.g., a big corporation) has a large private cloud infrastructure (e.g., more than 10 virtual infrastructure servers, each containing over 20,000 VMs), the standard configuration of the OVA file results in an agent that has insufficient CPU, memory, storage, etc., thereby decreasing the efficiency of data collection.

Examples disclosed herein customize a OVA file on the public cloud side so that an appropriate amount of resources can be utilized in the deployment of an agent in the private cloud. Because rebuilding an entire OVA file from scratch takes a significant amount of time, examples disclosed herein reconfigure an already deployed OVA file in the public cloud to configure specifications (e.g., amount of CPU, Memory, and/or storage to utilize for the deployed agent in the private cloud) that correspond to the desires of a user and/or the structure of the virtual infrastructure ecosystem for the user in the private cloud. For example, an OVA file is a package that may include a .mf file, a .vmdk file, and a descriptor file (e.g., a .ovf file). The descriptor file (e.g., the .ovf file) may be the open virtualization format file in the OVA file that provides metadata for the OVA package (e.g., including name, hardware requirements, referenced to other files and/or human-readable descriptions). Examples disclosed herein unpack the OVA file and modify the .ovf file within the OVA file to include the custom specifications (e.g., how much CPU, memory, storage, etc. to utilize for the agent) and repacks the OVA to include the modified .ovf file. In this manner, when the user sends an indication of a location of (e.g., a link to) the modified OVA file to the virtual infrastructure server in the private cloud, the virtual infrastructure server can process the .ovf file to deploy the agent based on the custom specifications. While examples disclosed herein are described in conjunction with an OVA file and a .ovf file, examples disclosed herein may be used in conjunction with any type of packaged file and/or descriptor file.

Additionally, as described above, the SaaS application may generate a security key (e.g., OTK) to enable the agent in the private cloud to communicate with the SaaS application in the public cloud via a firewall. Traditionally, when a user attempted to deploy an agent in the private cloud to communicate with the SaaS application in the public cloud, the SaaS application generated a prompt that identified the secure key, and the user copied the key and provided it to the private cloud (e.g., via a second prompt). However, manually adding secure keys is repetitive and prone to error. Additionally, a key may have an expiry which may not be known to the user. Accordingly, if the user does not deploy the agent within a threshold amount of time, the key may expire and the process will need to be restarted from scratch. Additionally, if the key is compromised, the holder of the key can impersonate an agent and send malicious data and/or perform denial of service attacks to the SaaS application. Examples disclosed herein alleviate the problems associated with manually adding a secure key using prompts for the private cloud by automatically storing the secure key in the .ovf file of the OVA file.

FIG. 1 is an illustration of an example environment 100 including an example private cloud 102 (e.g., private cloud network), an example firewall 109, an example public cloud 110 (e.g., public cloud network), and an example user device 118. The example private cloud 102 includes an example virtual infrastructure server 104, an example network virtualization manager 106, and an example data collection agent 108. The example public cloud 110 includes a first example SaaS application (e.g., SaaS A) 112, a second example SaaS application (e.g., SaaS B) 114, and an example OVA file converter 116. Although the example public cloud 110 includes two SaaS applications, the example public cloud 110 may be multiple couples including any number of SaaS applications (e.g., a first cloud including SaaS A application 112 and a second cloud including SaaS B application 114, the public cloud 110 including additional SaaS applications, multiple clouds including multiple SaaS applications, etc.).

The example private cloud 102 (e.g., private cloud network) is a configurable pool of computing resources that is isolated from public networks. For example, the private cloud 102 is isolated from public networks via the firewall 109. The private cloud 102 includes any number of virtual resources and/or virtual machines that are available for the example user device 118 to use. Additionally or alternatively, one or more of the virtual resources and/or virtual machines in the private cloud 102 may correspond to hardware computing resources located remote from the user device 118. The example private cloud 102 includes the example virtual infrastructure server 104, the example network virtualization manager 106, and the example data collection agent 108. Additionally, the private cloud 102 may include additional components, servers, networks, virtual machines, hardware switches, etc.

The example virtual infrastructure server 104 of FIG. 1 a computing device (e.g., a processor, a server, etc.) on which a virtualization suite was deployed. The virtual infrastructure server 104 included a collection of components to setup and manage virtual infrastructure of servers, networks, and/or other resources of the private cloud 102. For example, the virtual infrastructure server 104 may collect and/or actuate on compute resources of the private cloud 102. The virtualization infrastructure server 104 may be a VMWARE VSPHERE® virtualization suite developed and provided by VMWARE®. The user of user device 118 manages the private cloud 102 via interaction with the virtual infrastructure server 104. For example, the user may use the user device 118 may send instructions to the example virtual infrastructure server 104 to deploy (e.g., implement) the example data collection agent 108 as a virtual machine running in the private cloud 102. The instructions may include an indication of a location of (e.g., a link to) an OVA file that includes a .ovf file that has been modified to include configuration information (e.g., desired amounts of CPU, memory, storage, etc.) to utilize for the example data collection agent 108 during deployment of the data collection agent 108. The example virtual infrastructure server 104 downloaded the OVA file using the link. Once the OVA file is downloaded, the virtual infrastructure server 104 processes the OVA file to determine the configuration information and deploys the data collection agent 108 in the private cloud 102 based on the configuration information. Additionally, the example virtualization infrastructure server 104 determines a secure key (e.g., by processing the .ovf file of the OVA) to allow the deployed data collection agent 108 to establish a connection to the example SaaS A application 112 and/or the example SaaS B application 114 through the firewall 109.

The example network virtualization manager 106 of FIG. 1 virtualizes network resources such as physical hardware switches (e.g., the management switches, ToR switches, and/or spine switches) to provide software-based virtual networks. The network virtualization manager 106 enables treating physical network resources (e.g., switches) as a pool of transport capacity. In some examples, network virtualization manager 106 also provides network and security services to VMs with a policy driven approach. The network virtualization manager 106 includes a number of components to deploy and manage virtualized network resources across servers, switches, and clients. For example, the network virtualization manager 106 includes a network virtualization manager that functions as a centralized management component of the network virtualization manager 106 and runs as a virtual appliance on a server host. In some examples, network virtualization manager 106 may be implemented using a VMWARE NSX™ network virtualization platform and/or manager (e.g., a centralized network management component providing an aggregated system view), a VMWARE NSX™ network virtualization controller (e.g., a central control point for all logical switches (e.g., ToR switches and/or spine switches) within the network maintaining information of all VMs, hosts, logical switch, and virtual extensible local area networks (VXLANs)), an NSX network virtualization edge (e.g., providing network edge security and gateway services to isolate the virtualized network), etc.

The example data collection agent 108 is a virtual machine that is deployed by the example virtual infrastructure server 104 to collect data from one or more of the SaaS applications 112, 114 in the public cloud 110. The example data collection agent 108 is configured to included resources (e.g., CPU and/or memory) that are sized based on the information in the .ovf of an OVA file downloaded by the virtual infrastructure server 104. Once deployed, the example data collection agent 108 utilizes the secure key (e.g., embedded in the .ovf file) to establish a connection to the SaaS application 112 and/or the example SaaS application 114 via the firewall 109. In this manner, the example data collection agent 108 can interface with the SaaS application 112 and/or the example SaaS application 114 to collect data for further processing in the private cloud 102. The example data collection agent 108 can transmit collected data from the public cloud 110 to the example virtual infrastructure server 104 and/or the example network virtualization manager 106 for further processing (e.g., for diagnosis, optimization, etc.).

The example firewall 109 of FIG. 1 is a network security system that monitors and/or manages network traffic into and/or out of the example private cloud 102. The example firewall 109 protects the private cloud 102 from external data from public and/or untrusted external networks. Although the firewall 109 block network traffic into and/or out of the private cloud 102, the firewall 109 can be configured to allow particular connections to the private cloud 102 from selected components and/or networks (e.g., the example SaaS applications 112, 114 by establishing a connection using a secure key. The secure key(s) may be used so that the SaaS application 112 and/or SaaS application 114 can communicate with the private cloud 102 through the firewall 109, but other public cloud 110 components cannot communicate with the private cloud 102. The example firewall 109 may be a physical or virtual firewall.

Figure 2:
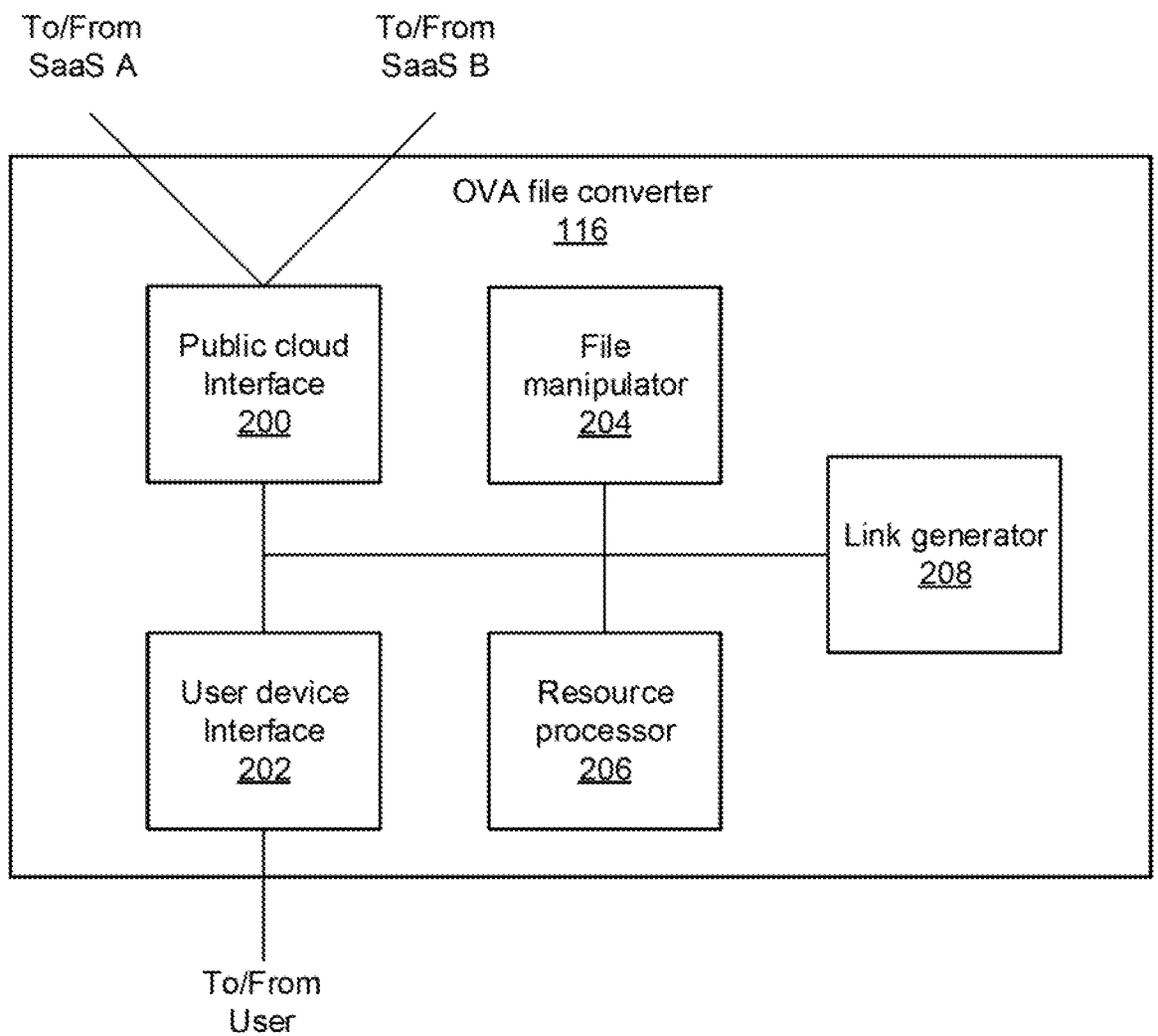
FIG. 2 is a block diagram of an example implementation of the open virtualization application file converter of FIG. 1.

The example SaaS applications 112, 114 of FIG. 2 are software which are provided by an administrator (e.g., a software company) for use in the public cloud 110 by the user of the user device 118. For example, when the administrator wants to provide SaaS to the user of the user device 118, the administrator deploys the SaaS applications 112, 114 in the public cloud 110 so that the user device 118 can utilize software in the public cloud 110 to perform tasks using resources in the public cloud 110 (e.g., as opposed to at the user device 118). For example, the administrator may deploy the SaaS applications 112, 114 by installing software on computing resources (e.g., servers, processing devices, etc.) controlled by the administrator. In such an example, the administrator provides an interface (e.g., API, web interface, remote connection, etc.) for the user device 118 to connect with, or otherwise interact with, one or more of the SaaS applications 112, 114. In this manner, the user device 118 can utilize the software executed by the SaaS application 112 on the remote computing resources instead of the computing resources of the user device 118. In some examples, the SaaS applications 112, 114 are licensed on a subscription basis to the user of the user device 118. For example, the user of the user device 118 may subscribe to the example SaaS A application 112 and/or the example SaaS B application 114 to utilize software and/or hardware (e.g., to perform services) provided by the administrator on the public cloud 110 without downloading the software and/or utilizing the hardware locally at the user device 118.

In some examples, the example SaaS applications 112, 114 of FIG. 1 may include components that generate secure keys, generate; obtain; and/or store OVA files, and/or communicate with the example data collection agent 108 and/or the example OVA file converter 116. Additionally or alternatively, the SaaS applications 112, 114 may communicate with other components of the public cloud 110 that generate secure keys and/or generate, obtain, and/or store OVA files. In some examples, the SaaS applications 112, 114 may include and/or communicate with a build tool (e.g., build-web) that generates an OVA file. In some examples, the SaaS applications 112, 114 may include and/or communicate with storage (e.g., an Amazon S3 bucket) to save obtained OVA files. In some examples, the SaaS applications 112, 114 include an interface to communicate with (e.g., received data from and/or transmit data to) (A) the example data collection agent 108 in the private cloud 102 through the example firewall 109 and/or (B) the example OVA file converter 116.

The example OVA file converter 116 of FIG. 1 generates a custom OVA file that identifies the amount of resources that the example data collection agent 108 will need once deployed. For example, the OVA file converter 116 obtains an OVA file stored in storage in the public cloud 110 (e.g., an Amazon S3 bucket), unpacks the OVA file to find the .ovf file, and restructures the .ovf file to configure the .ovf file with the custom amount of resources capacity (e.g., CPU capacity, memory capacity, storage capacity, etc.) to use for the deployed data collection agent 108. Because the OVA file may be preset and may take a long time to generate from scratch, the example OVA file converter 116 modifies the already generated OVA file to generate the custom OVA file, as opposed to generating and/or instructing a component to generate a new OVA file. In this manner, an already generated present OVA file can be converted into a custom OVA file with significantly less time than generating a new custom OVA file. The example OVA file converter 116 may, for example, transmit a prompt to the example user device 118 and/or the example SaaS applications 112, 114 to identify the service ID, metrics count, events type count, collection frequency, full inventory sync, and/or inventory size, which are used to determine how to size the amount CPU capacity and memory capacity for the soon-to-be deployed data collection agent 108. The service ID is a unique identifier for the SaaS application (e.g., SaaS application 112 and/or SaaS application 114), the metrics count is the number of metrics that is collected for the SaaS application, events type count is the number of event types that is collected for the SaaS application, collection frequency is how often a collection cycle is done, full inventory sync is the full inventory collected in each collection cycle, and the inventory size corresponds to the number of objects in the example private cloud 102. An example of how the OVA file converter 116 may determine the amount of CPU capacity and memory capacity for the example data collection agent 108 is shown below in algorithms included in Tables 1 and 2.

TABLE 1

Manifest-based Sizing Algorithm

Baseline CPU => 1 vCPU
Baseline Memory => 521 MB
Sizing Factor => 1
For each Service Manifest:
    Metrics Count based Sizing
        MetricCountFactor => ((Metrics Count) % 100) / 10
    Events Type Count based Sizing
        EventCountFactor => ((Events Type Count) % 10) / 10
    Collection Frequency based Sizing
        CollectionFrequencyFactor => (((10 − Collection Frequency) % 10) /10 Inventory sync type-based Sizing
        FullInventorySyncFactor=>Full Inventory Sync > Yes:1, No:0 => (Full Inventory Sync/10)
    Manifest Sizing Factor => MetricCountFactor + EventCountFactor + CollectionFrequencyFactor + FullInventorySyncFactor
Sizing Factor = Sizing Factor + Manifest Sizing Factor

TABLE 2

Inventory count-based Sizing Algorithm

Input from user => InventorySize
InventoryCountFactor => (InventorySize / 1000)
Baseline CPU => From Sizing Algorithm
Sizing Factor => From Sizing Algorithm
Agent CPU Size => Ceil to nearest whole number [Baseline CPU * Sizing Factor * InventoryCountFactor]
Agent Memory Size => Ceil to the nearest multiple of 64 [Baseline Memory * Sizing Factor * InventoryCountFactor]

Once the example OVA file converter 116 determines the Agent CPU size and/or Memory size for the data collection agent 108, the OVA file converter 116 adds the CPU size and/or Memory size to the .ovf file (e.g., modifies the .ovf file to configure the .ovf file with the CPU size and/or Memory size). Additionally or alternatively, the OVA file converter 116 of FIG. 1 generates and/or otherwise obtains (e.g., from the SaaS application(s) 112, 114, and/or another component of the public cloud 110) a secure key (e.g., an OTK) and imbeds secure key in the .ovf file as shown below in algorithm of Table 3.

TABLE 3

Dynamic secret generation

AgentUUID => Generate a UUID for an Agent
OTK => Base64Encoding [AgentUUID, CustomerID, { Service ID,...,...}]

Once the .ovf file has been modified (e.g., to configure the .ovf file with the CPU Memory, and/or secret key), the example OVA file converter 116 repacks the files of the OVA file using the modified .ovf file and the original a .mf file and a .vmdk file of the OVA file, thereby generating a modified OVA file. The OVA file converter 116 replaces the original OVA file with the modified OVA file in the storage where the original OVA file was stored. The example OVA file converter 116 generates an indication of a location of (e.g., a link to) the example OVA file and transmits the link to the example user device 118.

Once the user device 118 obtains the indication of a location of (e.g., the link to) for the modified OVA file, the user of the user device 118 provides the location/link to the example virtual infrastructure server 104 in the private cloud 102. In this manner, the example virtual infrastructure server 104 can process the modified OVA file to determine the secret key (e.g., for establishing the connection to the example SaaS application 112 and/or SaaS application 114 through the firewall 109) and/or the capability amount of the CPU resources/capacity and/or the memory capacity to give to the data collection agent 108 for operation after being deployed. Once the virtual infrastructure server 104 deploys the data collection agent 108, the data collection agent 108 is able to communicate with the example SaaS application 112, 114 in the private cloud 102 through the firewall 109 with an appropriate amount of CPU and/or Memory.

FIG. 2 is a block diagram of an example implementation of the OVA file converter 116 of FIG. 1. The example OVA file converter 116 includes an example public cloud interface 200, an example user device interface 202, an example manipulator 204, an example resource processor 206, and an example link generator 208.

The example public cloud interface 200 of FIG. 2 interfaces with components of the public cloud 110 (e.g., including the example SaaS A application 112 and/or the example SaaS B application 114). For example, the public cloud interface 200 may obtain (e.g., receive, retrieve, etc.) an already generated OVA file in storage in the public cloud 110 (e.g., storage located in the SaaS application 112 and/or the SaaS application 114). In some examples, the SaaS application(s) 112, 114 and/or the administrator of the SaaS application(s) 112, 114 generate a preset OVA file that corresponds to a preset amount of resources for an agent to be deployed in the private cloud 102. Once the already generated OVA file is modified, the example public cloud interface 200 may interface with the storage in the public cloud 110 to store the modified OVA file in the location where the preset OVA file was located in the public cloud 110. In this manner, the preset OVA file can be pulled from the location of storage, modified, and, after modification, stored back in the same location of the storage so that the private cloud 102 can download the custom/modified OVA file from the location (e.g., as opposed to the original preset OVA file). Additionally, the example public cloud interface 200 may obtain a secure key from the components of the public cloud 110.

The example user device interface 202 of FIG. 2 interfaces with the user device 118. For example, the user device interface 202 may transmit prompts to the user device 118 prompting the user for information (e.g., metrics count, events type count collection frequency, full inventory sync, inventory size, etc.) that may be used to determine the size/amount/capacity of resources for the data collection agent 108 once it is deployed in the private cloud 102. Additionally, once the example OVA file converter 116 generates an indication of a location (e.g., a link to a location) of a modified OVA file, the example user device interface 202 transmits the location indication/link to the device of the user device 118. In this manner, the user can provide the location indication/link to the virtual infrastructure server 104 of the private cloud 102 to initiate deployment of the data collection agent 108 (e.g., to be able to collect data from the example SaaS application 112 and/or SaaS application 114) based on the resource information (e.g., the capability amount of the CPU resources/capacity, the memory capacity, etc.) imbedded in the .ovf file of the OVA. Although the example block diagram of FIG. 2 includes two interfaces (e.g., the public cloud interface 200 and the user device interface 202), the two interfaces may be combined into one interface.

When the example public cloud interface 200 obtains an OVA file from the public cloud 110 (e.g., an Amazon S3 bucket in the SaaS application 112 and/or the SaaS application 114), the example file manipulator 204 of FIG. 2 unpacks and/or otherwise extracts the files of the OVA file (e.g., a .mf file, a .vmdk file, a .ovf file, etc. within the OVA file). In this manner, the example file manipulator 204 can manipulate the .ovf file of the OVA file to configure the .ovf file with (A) the resources to use for the data collection agent 108 and/or (B) the secure key. After the resource processor 206 determines the resources for the data collection agent 108, as further described below, the file manipulator 204 modifies the .ovf file to configure the .ovf file with the determined resources. Additionally or alternatively, the example file manipulator 204 may modify the .ovf file of the OVA file to configure the .ovf file with a secure key (e.g., a OTK obtained from the SaaS application 112 and./or the SaaS application 114).

The example resource processor 206 of FIG. 2 determines the appropriate amount of resources (e.g., the amount of CPU capacity, memory capacity, storage capacity, etc.) to use for the data collection agent 108 in the private cloud 102. The example resource processor 206 increases the resources for agents that will operate for a higher number of metrics to be collected, a higher number of event types to be collected, more frequent collection cycles, a higher inventory to be collected, and/or a higher number of components (e.g., virtual machines, virtual infrastructure servers, etc.) in the private cloud 102. In some examples, the resource processor 206 determines the resources by starting with a baseline amount of the CPU resources/capacity and/or the memory capacity and increasing the amount of the CPU capacity and/or memory capacity based on a sizing factor corresponding to the characteristics of the agent, as shown above in conjunction with the above Tables 1 and 2. In some examples, the resource processor 206 generates the secure key, as shown above in conjunction with Table 3. Once the resource processor 206 modifies the .ovf file, the file manipulator 204 repacks the OVA file with the modified .ovf file and the original .mf file and .vmdk file to create a modified OVA file and the public cloud interface 200 stores the modified OVA file in the location where the OVA file was obtained.

The example link generator 208 of FIG. 2 generates an indication of a location of (e.g., a link to the location of) of the modified .ovf file. The example user device interface 202 provides the location indication/link to the example user device 118. In this manner, the user can provide the link (e.g., using the user device 118) to his virtual infrastructure server 104 in his private cloud 102, thereby allowing the virtual infrastructure server 104 to download the modified OVA file and use the information in the OVA file to deploy the data collection agent 108 with the resources and/or secure key included in the modified .ovf file.

While an example manner of implementing the OVA file converter 116 of FIG. 1 is illustrated in FIG. 2, one or more of the elements, processes and/or devices illustrated in FIG. 2 may be combined, divided, re-arranged, omitted, eliminated and/or implemented in any other way. Further, the example public cloud interface 200, the example user device interface 202, the example file manipulator 204, the example resource processor 206, the example link generator 208, and/or, more generally, the example OVA file converter 116 of FIG. 2 may be implemented by hardware, software, firmware and/or any combination of hardware, software and/or firmware. Thus, for example, any of the example public cloud interface 200, the example user device interface 202, the example file manipulator 204, the example resource processor 206, the example link generator 208, and/or, more generally, the example OVA file converter 116 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example public cloud interface 200, the example user device interface 202, the example file manipulator 204, the example resource processor 206, the example link generator 208, and/or, more generally, the example OVA file converter 116 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example OVA file converter 116 of FIG. 1 may include one or more elements, processes and/or devices in addition to, or instead of, those illustrated in FIGS. 1 and/or 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
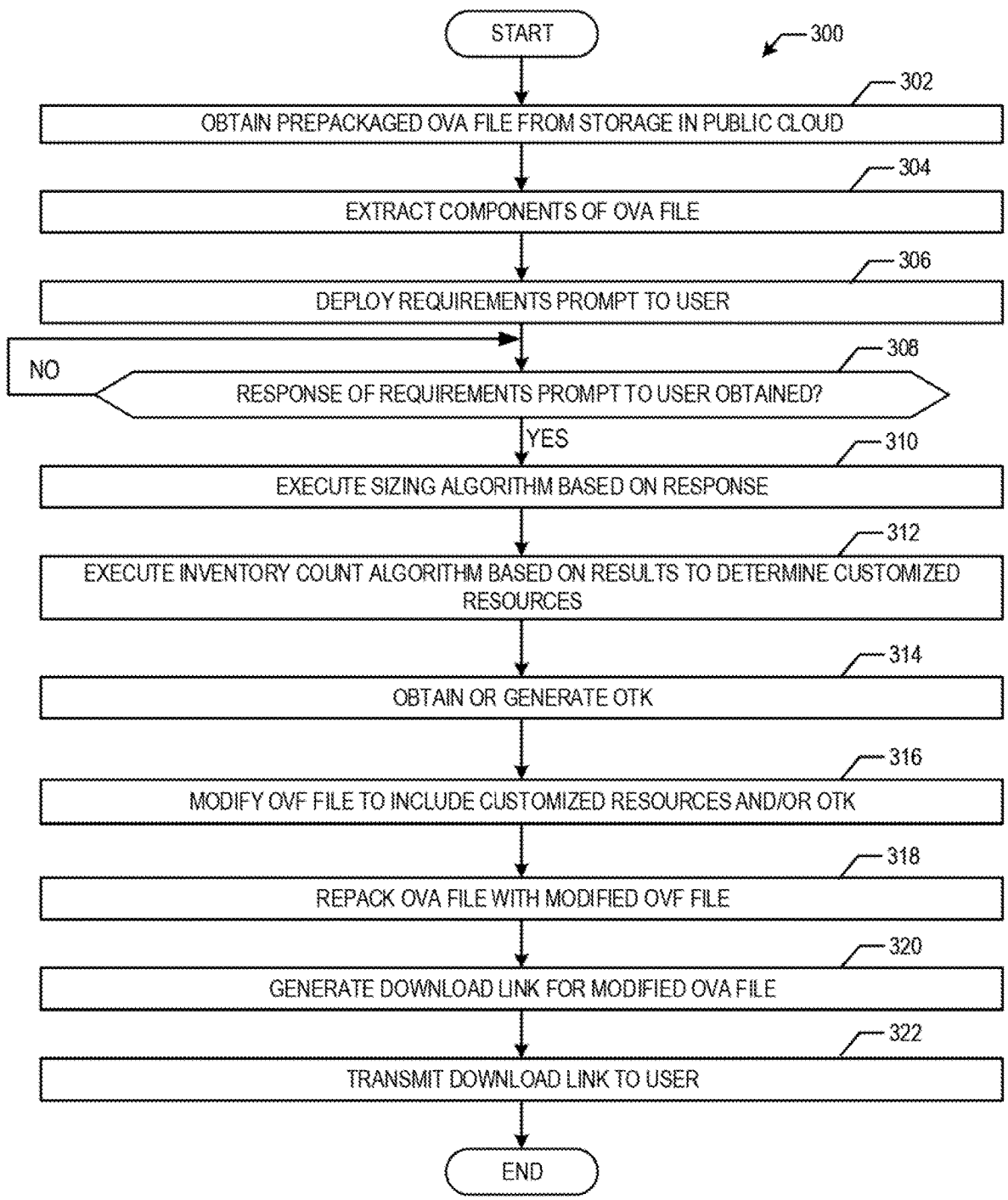
FIG. 3 is a flowchart representative of example machine readable instructions which may be executed to implement the open virtualization application file converter of FIGS. 1 and/or 2 to generate a customized open virtualization application file.

A flowchart representative of example hardware logic, machine readable instructions, hardware implemented state machines, and/or any combination thereof for implementing the example OVA file converter 116 is shown in FIG. 3. The machine readable instructions may be one or more executable programs or portion(s) of an executable program for execution by a computer processor such as the processor 412 shown in the example processor platform 400 discussed below in connection with FIG. 4. The program may be embodied in software stored on a non-transitory computer readable storage medium such as a CD-ROM, a floppy disk, a hard drive, a DVD, a Blu-ray disk, or a memory associated with the processor 412, but the entire program and/or parts thereof could alternatively be executed by a device other than the processor 412 and/or embodied in firmware or dedicated hardware. Further, although the example program is described with reference to the flowchart illustrated in FIG. 3, many other methods of implementing the example OVA file converter 116 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example process of FIG. 3 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 3 is a flowchart representative of example machine readable instructions 300 which may be executed to implement the OVA file converter 116 of FIG. 1 to generate a custom OVA file to deploy a custom agent in a private cloud to interface with a SaaS application deployed in a public cloud. The example instructions are described in conjunction with customizing an agent to interface with the example SaaS application 112. However, the instructions 300 may be utilized to interface with an additional and/or alternative component of the public cloud 110 (e.g., the example SaaS B application 114).

At block 302, the example public cloud interface 200 obtains a prepacked OVA file from storage in the public cloud 110. For example, the public cloud interface 200 may interface with storage in and/or in communication with the SaaS application 112 that includes the OVA file. The prepackaged OVA file is generated by a build tool (e.g., buildweb). At block 304, the example file manipulator 204 extracts components of the OVA file. For example, the file manipulator 204 determines (e.g., unpacks) the .ovf file from the OVA file. At block 306, the example user device interface 202 deploys a requirements prompt to the user of the user device 118. The prompt may include questions for the user to answer to identify the requirements for the agent including data related to the metrics count, events type count, collection frequency, full inventory sync, and/or inventory size corresponding to the agent that is to be deployed in the user's private cloud 102. In some examples, some of the requirements information may be obtained from the SaaS application 112, 114 and/or another component of the public cloud 110 via the public cloud interface 200.

At block 308, the example user device interface 202 determines if a response to the requirements prompt to the user has been obtained. If the example user device interface 202 determines that a response to the prompt has not been received (block 308: NO), control returns to block 308 until a response has been received. If the example user device interface 202 determines that a response to the prompt has been received (block 308: YES), the example resource processor 206 executes a sizing algorithm based on the requirement information in the response (block 310). For example, the resource processor 206 may execute the sizing algorithm of the above Table 1 to determine a sizing factor. At block 312, the example resource processor 206 executes an inventory count algorithm based on the results of the sizing algorithm to determine the customized resources for the agent (e.g., the amount of capacity/resources (CPU capacity, memory capacity, etc.) to allocate for the data collection agent 108). For example, the resource processor 206 may execute the inventory count algorithm of the above Table 2 to determine the resources.

At block 314, the example public cloud interface 200 obtains (e.g., from the SaaS application 112) a secure key (e.g., OTK) or the resource processor 206 generates a secure key (e.g., OTK). The secure key allows the components of the private cloud 102 and the public cloud 110 to establish a secure connection through the firewall 109. At block 316, the example file manipulator 204 modifies the .ovf file to configure the .ovf file with the OTK and/or the customized resources based on the determined resources. For example, the file manipulator 204 modifies the .ovf file to configure the .ovf file with the customized resource information and/or the secure key.

At block 318, the example file manipulator 204 repacks the OVA file with the modified .ovf file. For example, the file manipulator 204 packs the modified .ovf file with the other files of the original OVA file (e.g., the .mf file and the .vmdk file) to generate a modified OVA file. At block 320, the example link generator 208 generates a download link (e.g., or other location indication) for the modified OVA file. The download link identifies the location of the modified OVA file in the public cloud 110. In this manner, when the link is passed to the virtual infrastructure server 104, the virtual infrastructure server 104 can download the modified OVA file and initiate deployment of the example data collection agent 108 in the private cloud 102.

At block 322, the example user device interface 202 transmits the download link to the user device 118. As described above, once the user has the link for the modified OVA file, the user can provide the link to the virtual infrastructure server 104 of the user's private cloud 102. The virtual infrastructure server 104 downloads the OVA file using the download link and processes the OVA file to identify the customized resources and deploys the example data collection agent 108 based on the customized resources. Once deployed, the example data collection agent 108 utilizes the secure key to establish a connection to the example SaaS application 112 through the firewall 109 so that the components of the private cloud 102 can collect data and/or perform diagnostics corresponding to the SaaS application 112 in the public cloud 110.

Figure 4:
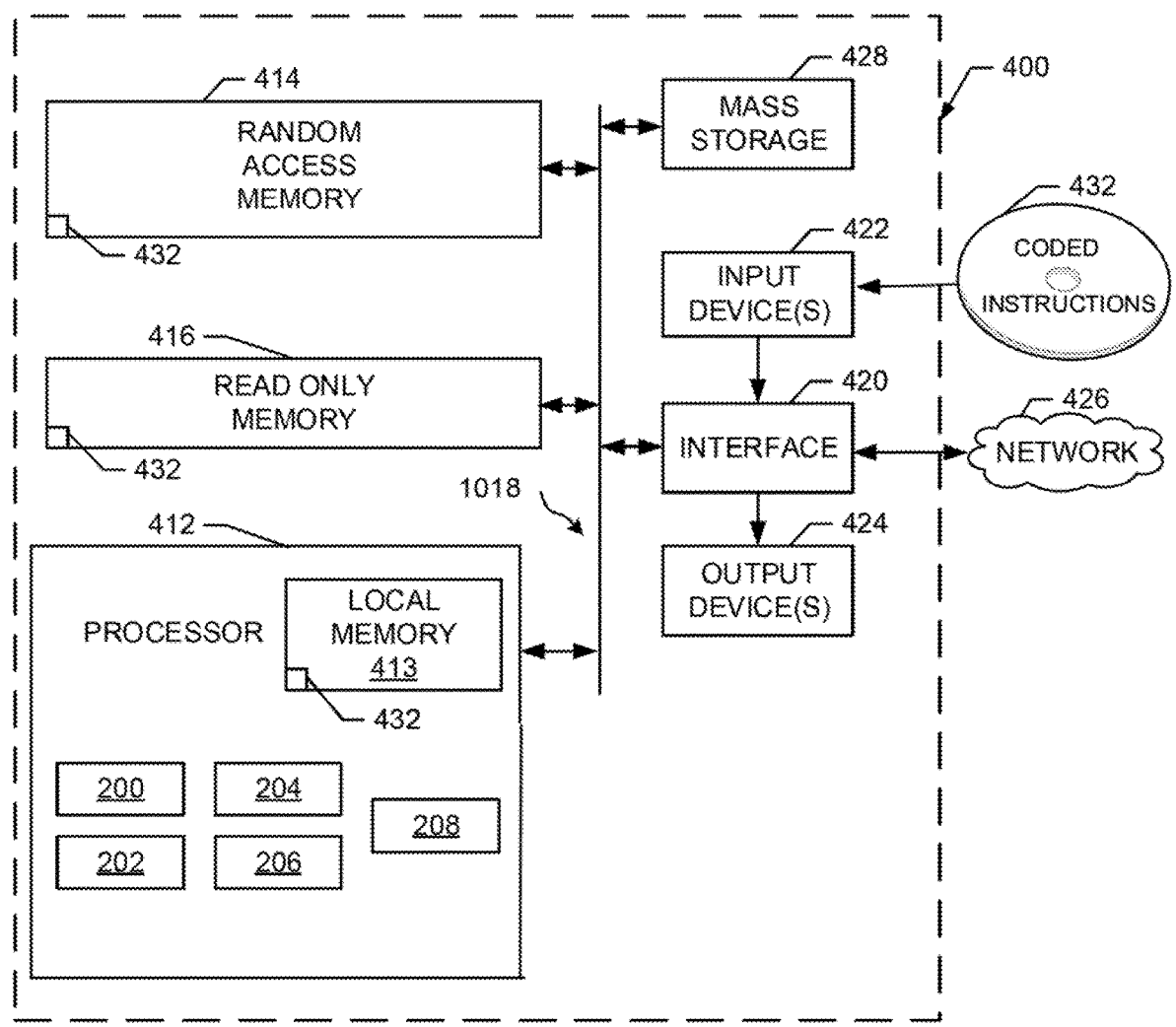
FIG. 4 is a block diagram of an example processor platform structured to execute the instructions of FIG. 3 to implement the example open virtualization application file converter of FIGS. 1 and/or 2.

FIG. 4 is a block diagram of an example processor platform 400 structured to execute the instructions of FIG. 3 to implement the example OVA file converter 116 of FIGS. 1 and/or 2. The processor platform 400 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 400 of the illustrated example includes a processor 412. The processor 412 of the illustrated example is hardware. For example, the processor 412 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example public cloud interface 200, the example user device interface 202, the example file manipulator 204, the example resource processor 206, and the example link generator 208 of FIG. 2.

The processor 412 of the illustrated example includes a local memory 413 (e.g., a cache). The processor 412 of the illustrated example is in communication with a main memory including a volatile memory 414 and a non-volatile memory 416 via a bus 418. The volatile memory 414 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 416 may be implemented by flash memory and/or any other desired type of memory device. Access to the main memory 414, 416 is controlled by a memory controller.

The processor platform 400 of the illustrated example also includes an interface circuit 420. The interface circuit 420 may be implemented by any type of interface standard, such as an Ethernet interface, a universal serial bus (USB), a Bluetooth® interface, a near field communication (NFC) interface, and/or a PCI express interface.

In the illustrated example, one or more input devices 422 are connected to the interface circuit 420. The input device(s) 422 permit(s) a user to enter data and/or commands into the processor 412. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 424 are also connected to the interface circuit 420 of the illustrated example. The output devices 424 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 420 of the illustrated example, thus, typically includes a graphics driver card, a graphics driver chip and/or a graphics driver processor.

The interface circuit 420 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 426. The communication can be via, for example, an Ethernet connection, a digital subscriber line (DSL) connection, a telephone line connection, a coaxial cable system, a satellite system, a line-of-site wireless system, a cellular telephone system, etc.

The processor platform 400 of the illustrated example also includes one or more mass storage devices 428 for storing software and/or data. Examples of such mass storage devices 428 include floppy disk drives, hard drive disks, compact disk drives, Blu-ray disk drives, redundant array of independent disks (RAID) systems, and digital versatile disk (DVD) drives.

The machine executable instructions 432 of FIG. 3 may be stored in the mass storage device 428, in the volatile memory 414, in the non-volatile memory 416, and/or on a removable non-transitory computer readable storage medium such as a CD or DVD.

From the foregoing, it will be appreciated that example methods, apparatus and articles of manufacture have been disclosed that provide a custom installable open virtualization application file for on-premise installation via the cloud. Examples disclosed herein generate a customized OVA-based agent in a private cloud that is able to communicate with a SaaS application deployed in a public cloud. The OVA-based agent is customized based on the load of the OVA-based agent (e.g., metrics count, event type count, collection frequency, full inventory sync, and/or inventory size). Examples disclosed herein generate the custom OVA-based agent by modifying a OVA file in the public cloud to include resource information (e.g., CPU, memory, etc.) that has been customized based on the load information. In this manner, when a server of the private cloud downloads the OVA file, the server can deploy the agent based on the resource information embedded in the OVA file. Additionally, examples disclosed herein embed secure key in the OVA file to eliminate the manual forwarding of a secure key generated in the public cloud to the private cloud.

Examples disclosed herein increase the efficiency of data collection agents by reducing the resources used in such collection agents when their load is small and increasing the resources when their load is large. In this manner, data collection agents can efficiently collect data with sufficient resources without wasting resources that will not be used. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
a resource processor to determine a resource capacity for an agent in a private cloud network;
a file manipulator to modify an open virtualization appliance (OVA) file by modifying a descriptor file of the OVA file to configure the resource capacity for the agent in the private cloud network, the OVA file being deployed in a public cloud network; and
a first interface to transmit an indication to a location of the modified OVA file to a user device, the location of the modified OVA file being the same location as the OVA file.

2. The apparatus of claim 1, wherein the indication to the location is provided to components of the private cloud network to initiate deployment of the agent in the private cloud network, the agent to include the resource capacity.

3. The apparatus of claim 2, wherein the agent is to interface with a software as a service (SaaS) application in the public cloud network.

4. The apparatus of claim 1, wherein the resource capacity corresponds to at least one of a central processing unit or memory.

5. The apparatus of claim 1, wherein the file manipulator is to modify the OVA file by modifying the descriptor file of the descriptor file to include a secure key.

6. The apparatus of claim 5, wherein the agent in the private cloud network is to establish a connection to a SaaS application in the public cloud network using the secure key.

7. The apparatus of claim 1, wherein:
the first interface is to transmit a prompt to the user device; and
the resource processor is to determine the resource capacity based on information received in a response to the prompt.

8. The apparatus of claim 7, wherein the response corresponds to a load of the agent.

9. The apparatus of claim 1, further including a second interface to obtain the OVA file from storage in the public cloud network.

10. The apparatus of claim 9, wherein the first interface is the second interface.

11. The apparatus of claim 9, wherein at least one of an administrator or a SaaS application stores the OVA file in the location and the second interface is to, after the OVA file was obtained from the location and modified, store the modified OVA file in the location where the OVA file was obtained.

12. A non-transitory computer readable storage medium comprising instructions which, when executed, cause one or more processors to at least:
determine a resource capacity for an agent in a private cloud network;
modify an open virtualization appliance (OVA) file by modifying a descriptor file of the OVA file to configure the resource capacity for the agent in the private cloud network, the OVA file being deployed in a public cloud network; and
transmit an indication to a location of the modified OVA file to a user device, the location of the modified OVA file being the same location as the OVA file.

13. The computer readable storage medium of claim 12, wherein the indication to the location is provided to components of the private cloud network to initiate deployment of the agent in the private cloud network, the agent including the resource capacity.

14. The computer readable storage medium of claim 13, wherein the agent interfaces with a software as a service (SaaS) application in the public cloud network.

15. The computer readable storage medium of claim 12, wherein the resource capacity corresponds to at least one of a central processing unit or memory.

16. The computer readable storage medium of claim 12, wherein the instructions cause the one or more processors to modify the OVA file by modifying the descriptor file of the descriptor file to include a secure key.

17. The computer readable storage medium of claim 16, wherein the agent in the private network establishes a connection to a SaaS application in the public cloud network using the secure key.

18. The computer readable storage medium of claim 12, wherein the instructions cause the one or more processors to:
transmit a prompt to the user device; and
determine the resource capacity based on information received in a response to the prompt.

19. The computer readable storage medium of claim 18, wherein the response corresponds to a load of the agent.

20. A method comprising:
determining a resource capacity for an agent in a private cloud network;
modifying an open virtualization appliance (OVA) file by modifying a descriptor file of the OVA file to configure the resource capacity for the agent in the private cloud network, the OVA file being deployed in a public cloud network; and
transmitting an indication to a location of the modified OVA file to a user device, the location of the modified OVA file being the same location as the OVA file.

21. The method of claim 20, wherein the indication to the location is provided to components of the private cloud network to initiate deployment of the agent in the private cloud network, the agent to include the resource capacity.

22. The method of claim 21, further including interfacing with a software as a service (SaaS) application in the public cloud network.

23. The method of claim 20, wherein the resource capacity corresponds to at least one of a central processing unit or memory.

24. The method of claim 20, wherein the modifying of the OVA file includes modifying the descriptor file of the descriptor file to include a secure key.

25. The method of claim 24, further including establishing, using the agent, a connection to a SaaS application in the public cloud network using the secure key.

26. The method of claim 20, further including:
transmitting a prompt to the user device; and
determining the resource capacity based on information received in a response to the prompt.

27. The method of claim 26, wherein the response corresponds to a load of the agent.

28. The method of claim 20, further including obtaining the OVA file from storage in the public cloud network.

29. The method of claim 28, further including storing the OVA file in the location and, after the OVA file was obtained from the location and modified, storing the modified OVA file in the location where the OVA file was obtained.

30. An apparatus comprising:
memory;
instructions on the apparatus; and
processor circuitry to execute the instruction to:
- determine a resource capacity for an agent in a private cloud network;
- modify an open virtualization appliance (OVA) file by modifying a descriptor file of the OVA file to configure the resource capacity for the agent in the private cloud network, the OVA file being deployed in a public cloud network; and
- transmit an indication to a location of the modified OVA file to a user device, the location of the modified OVA file being the same location as the OVA file.

31. The apparatus of claim 30, wherein the indication to the location is provided to components of the private cloud network to initiate deployment of the agent in the private cloud network, the agent to include the resource capacity.

32. The apparatus of claim 31, wherein the processor circuitry is to interface with a software as a service (SaaS) application in the public cloud network.

33. The apparatus of claim 30, wherein the resource capacity corresponds to at least one of a central processing unit or memory resources.

34. The apparatus of claim 30, wherein the processor circuitry is to modify the OVA file by modifying the descriptor file of the descriptor file to include a secure key.

35. The apparatus of claim 34, wherein the processor circuitry is to establish, using the agent, a connection to a SaaS application in the public cloud network using the secure key.

36. The apparatus of claim 30, wherein the processor circuitry is to:
- transmit a prompt to the user device; and
- determine the resource capacity based on information received in a response to the prompt.

37. The apparatus of claim 36, wherein the response corresponds to a load of the agent.

38. The apparatus of claim 30, wherein the processor circuitry is to obtain the OVA file from storage in the public cloud network.

39. The apparatus of claim 38, wherein the processor circuitry is to store the OVA file in the location and, after the OVA file was obtained from the location and modified, store the modified OVA file in the location where the OVA file was obtained.

* * * * *